(12) United States Patent
den Bergh et al.

(10) Patent No.: US 7,193,226 B2
(45) Date of Patent: Mar. 20, 2007

(54) SCRATCH RESISTANT MOISTURE-PROTECTING PARYLENE LAYERS

(75) Inventors: Rudy Van den Bergh, Lint (BE); Thomas Cabes, Lier (BE)

(73) Assignee: AGFA-Gevaert, Mortsel (BE)

( * ) Notice: Subject to any disclaimer, the term of this patent is extended or adjusted under 35 U.S.C. 154(b) by 231 days.

(21) Appl. No.: 10/939,697

(22) Filed: Sep. 13, 2004

(65) Prior Publication Data

US 2005/0067584 A1  Mar. 31, 2005

Related U.S. Application Data

(60) Provisional application No. 60/510,908, filed on Oct. 14, 2003.

(30) Foreign Application Priority Data

Sep. 30, 2003  (EP) ................... 03103618

(51) Int. Cl.
G03B 42/08 (2006.01)
G21K 4/00 (2006.01)

(52) U.S. Cl. ................................ 250/484.4

(58) Field of Classification Search ............. 250/484.4
See application file for complete search history.

(56) References Cited

U.S. PATENT DOCUMENTS

| | | | |
|---|---|---|---|
| 3,859,527 A | 1/1975 | Luckey | 250/327 |
| 4,741,993 A | 5/1988 | Kano et al. | 430/536 |
| 4,784,881 A | 11/1988 | Fiore et al. | 427/255.6 |
| 5,466,947 A | 11/1995 | Fleig et al. | 250/582 |
| 2003/0071228 A1* | 4/2003 | Bergh et al. | 250/484.4 |

FOREIGN PATENT DOCUMENTS

| | | |
|---|---|---|
| EP | 1 286 362 | 2/2003 |
| EP | 1 286 363 | 2/2003 |
| EP | 1 286 364 | 2/2003 |
| EP | 1 286 365 | 2/2003 |
| GB | 2 287 864 | 9/1995 |
| GB | 2302670 | 1/1997 |

OTHER PUBLICATIONS

EP 03 10 3618 European Search Report, Mar. 16, 2004, Stabel.

* cited by examiner

*Primary Examiner*—David Porta
*Assistant Examiner*—Mindy Vu
(74) *Attorney, Agent, or Firm*—Joseph T. Guy; Nexsen Pruet, LLC

(57) ABSTRACT

A sheet or foil comprises a layer unit, divided into at least two layers: a layer A, being a layer of parylene and a layer B, wherein layer B, optionally present at both sides of layer A, is characterized in that it comprises an organic coating having at least one phosphoric acid ester compound.

45 Claims, No Drawings

SCRATCH RESISTANT MOISTURE-PROTECTING PARYLENE LAYERS

RELATED APPLICATIONS

The application claims the benefit of U.S. Provisional Application No. 60/510,908 filed Oct. 14, 2003.

DESCRIPTION

Field of the Invention

The present invention relates to a solution for improving adhesion between a parylene layer and an organic layer adjacent thereto showing excellent scratch resistance.

Particularly the invention is related to an improved adhesion of a scratch resistant layer when said parylene layer is coated onto a panel support.

More particularly the present invention is related with a phosphor sheet or panel, preferably having a very moisture sensitive CsBr:Eu phosphor, wherein said phosphor layer is covered with a moisture protecting parylene layer coated as a protective layer on top thereof, and with a method of preparing such phosphor sheet or panel.

BACKGROUND OF THE INVENTION

A well-known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern as disclosed e.g. in U.S. Pat. No. 3,859,527 a special type of phosphor is used, known as a photostimulable phosphor, which being incorporated in a panel, is exposed to incident pattern-wise modulated X-ray beam and as a result thereof temporarily stores energy contained in the X-ray radiation pattern. At some interval after the exposure, a beam of visible or infra-red light scans the panel to stimulate the release of stored energy as light that is detected and converted to sequential electrical signals which can be processed to produce a visible image. For this purpose, the phosphor should store as much as possible of the incident X-ray energy and emit as little as possible of the stored energy until stimulated by the scanning beam. This is called "digital radiography" or "computed radiography".

In both kinds of radiography it is preferred to be able to choose the phosphor that will be used on the basis of its speed and image quality without having to bother about its hygroscopicity.

Therefore it is highly desired to have the possibility of producing a phosphor panel, be it for use in direct radiography or in computed radiography, that is impervious to water vapour. In U.S. Pat. No. 4,741,993 a radiation image storage panel is disclosed having at least one stimulable phosphor layer on a support and a protective layer provided on the stimulable phosphor layer, wherein the protective layer comprises at least two layers of which regains under a relative humidity of 90% on a sorption isotherm at 25° C. are different by 0.5% or more. According to that invention, a radiation image storage panel which has good humidity resistance and can be used for a long term is obtained. Although a protective layer as disclosed in U.S. Pat. No. 4,741,993 does provide good humidity protection, the need for providing phosphor panels with even better humidity resistance is still present.

Use of parylene layers as humidity protective layers of hygroscopic photo-stimulable phosphor screen layers has been disclosed in e.g. EP-A-1 286 362 and EP-A-1 286 365. Also in DE-A-196 25 912 and GB-A-2 287 864 phosphor screens containing a parylene layer are disclosed.

Although screens prepared according to the disclosures above do yield screens with an acceptable to even a very good overall quality, the need for a phosphor screen combining good humidity resistance and good resistance against physical damage, especially scratch resistance during use is still present. This problem is posed the more after frequent use of desired CsBr-based phosphor plates and as a result thereof the image quality thereof is reduced as a function of time. When the plates have to be cleaned or when they are taken out of the cassette the parylene layer, normally offering an adequate protection against moisture for the hygroscopic CsBr-based phosphor, may be damaged because parylene has a very low scratch resistance resulting again in a stability problem of the image plate.

Coating of a layer onto the parylene layer is thus highly desired as has e.g. been described in EP-A-1 286 364. From that radiation cured polymeric layer coated onto said parylene layer in order to further essentially prevent the phosphor plate against physical damage as a scratch resistant layer it is known that, over a long period of frequent use, adhesion of organic or inorganic polymer layers towards parylene coating is low. As a consequence adhesion problems may occur in the course of the life time of an imaging plate, especially after frequent use.

OBJECTS AND SUMMARY OF THE INVENTION

It is object of the present invention to improve adhesion of an organic layer onto a p-xylylene (parylene) layer, in order to make a sheet or foil comprising a layer unit with parylene layers more scratch resistant, so that its moisture-repellent or moisture protective properties are maintained.

It is more particularly an object of the present invention to provide panel, and more particularly a phosphor screen or panel providing, besides protection against moisture, an excellent scratch resistance, even after a long time of frequent use and re-use.

It is moreover an object of the present invention to prevent loss of image quality after said frequent re-use of a storage phosphor panel, and, more particularly, to provide a binderless storage phosphor panel therefor with an excellent scratch resistance, even in case of storage phosphor panels having a phosphor layer coated with very moisture sensitive photostimulable doped alkali halide phosphors.

A further object of the present invention is to provide a method for improving adhesion of an organic coating onto p-xylylene (parylene) polymer layers and a method to prepare plates or panels having phosphor layers coated with such a protective outermost layer unit.

The above mentioned objects have been realized by providing a sheet or foil comprising a layer unit of an organic coating onto a p-xylylene (parylene) polymer layer, having the specific features defined in the corresponding independent claim 1 and by applying a method for improving adhesion of an organic coating onto said p-xylylene (parylene) polymer layer. Specific features for preferred embodiments of the present invention are disclosed in the dependent claims, regarding panels coated with said sheet or foil, and, more particularly, phosphor panels, as well as methods to prepare such sheets, foils or panels.

Further advantages and specific embodiments of the present invention will become apparent from the following description.

DETAILED DESCRIPTION OF THE INVENTION

A sheet or foil according to the present invention thus comprises a layer unit, divided into at least two layers: a layer A, being a layer of parylene and a layer B, wherein layer B, optionally present at both sides of layer A and, in that case, sandwiched between 2 B-layers as a B-A-B triple layer unit -, is characterized in that it comprises at least one phosphoric acid ester compound according to the general formula (I)

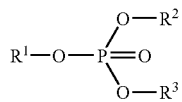

wherein each of $R^1$, $R^2$ and $R^3$ are same or different, and are selected from the group consisting of hydrogen, a saturated or unsaturated, substituted or unsubstituted aliphatic group and a substituted or unsubstituted aromatic group. It is clear that simultaneous presence of hydrogen for all three of the R-substituent is excluded as in that case general formula (I) does not represent an organic phosphoric acid ester anymore, but phosphoric acid as such. Moreover organic or inorganic (usually alkali metal) salts are are also mentioned.

A sheet or foil in a layer arrangement A-B is very useful in order to form a package for every moisture-sensitive subject, wherein advantageously said foil has its A-layer in contact with the subject and its B-layer in contact with the surrounding atmosphere from which it should be protected from moisture and from scratches, which may irreversibly damage the parylene moisture-barrier. Alternatively a sheet or foil in a layer arrangement B-A-B may be recommended as a particular protection against damaging scratches, not only from the ambient atmosphere, but also from e.g. sharp edges of the subject to be packed.

According to the present invention a sheet or foil having a layer B comprises at least one phosphoric acid ester compound selected from the group of compounds consisting of methacryl-ethyl phosphate, acryl-ethyl phosphate, dimethacrylethyl phosphate, methacrylethyl-methacrylpropyl-phosphate, di-acrylethyl phosphate, methacrylpropyl phosphate, acrylpropyl phosphate, dimethacrylpropyl phosphate, methacrylethyl-methacryl-propyl phosphate, dodecyl-polyethyleenglycolphosphate, polyethylene glycol-tridecylether phosphate, monoalkylphenyl-polyethyleenglycol phosphate, dioctylphenyl-polyethyleenglycol phosphate, 2-(phosphonoxy)ethyl-2-propenoate, 4-(phosphonoxy)butyl-2-propenoate, phosphinicobis(oxy-2,1-ethandiyl)-di-2-propenoate, tris-acryloyl-oxyethyl phosphate, nonylphenol ethoxylate phosphate, phenol ethoxylate phosphate, diethyl (ethoxycarbonyl-methane)phosphonate, ethoxylated fatty alcohol phosphate, ethoxylated tridecyl phosphate mixture, mixture of mono,di,tri-tridecylethyleneglycol phosphate, polyethylene glycol tridecyl ether phosphate, diethyl ethyl phosphonate, dimethyl propyl phosphonate, diethyl N,N-bis (2-hydroxyethyl)amino methyl phosphonate, phosphonic acid methyl(5-methyl-2-methyl-1,3,2-dioxaphosphorinan-5-y) ester, P,P'-dioxide, phosphonic acid, methyl(5-methyl-2-methyl-1,3,2-dioxaphosphorinan-5-yl)methyl, methyl ester, P-oxide, triethyl phosphate, 2-ethylhexyl diphenyl phosphate, iso-decyl diphenyl phosphate, iso propylated triphenyl phosphate, isopropylated triphenyl phosphate, iso butylated triphenyl phosphate, triphenyl phosphate, cresyl diphenyl phosphate, tributyl phosphate and tricresyl phosphate, without however being limited hereto.

Typical examples of alifatic ester compounds suitable for use as phosphoric acid esters in the B-layer(s) set forth above are methacryl ethylphosphate, acryl ethylphosphate, dimethacryl ethylphosphate, diacryl ethylphopsphate, methacrylethyl-methacrylpropyl-phosphate, dodecyl polyethyleenglycol phosphate and polyethyleneglycol tridecylether phosphate.

Typical examples of aromatic ester compounds suitable for use as phosphoric acid esters in the B-layer(s) set forth above are monoalkyl-phenyl polyethyleenglycol phosphate (known as "RHODAFAC RE 870" from RHODIA CHEMIE, France) and dioctylphenyl polyethyleenglycol phosphate (known as "RHODAFAC RM 710" from RHODIA); nonylphenol ethoxylate phosphate esters (CAS No. 68412-53-3) and phenol ethoxylate phosphate esters (CAS No. 39464-70-5).

Typical examples of saturated ester compounds suitable for use as phosphoric acid esters in the B-layer(s) set forth above are 2-(phosphonoxy)ethyl-2-propenoate (CAS No. 32120-16-4), 4-(phosphonoxy)butyl-2-propenoate (CAS No. 110507-31-8), phosphinicobis(oxy-2,1-ethandiyl)-di-2-propenoate(CAS No. 40074-34-8) and tris-acryloyl-oxyethyl phosphate (CAS No. 35057-49-9).

Other well-known phosphate esters, suitable for use in the layer arrangement of the present invention as set forth above, are commercial products from RHODIA as PHOSBRITE® 156,171,193,261,265, 271,272 and 951; RHODAFAC® RA600 (CAS No. 68130-47-2) and RHODAFAC® ASI80; diethyl(ethoxycar-bonyl-methane) phosphonate; ethoxylated fatty alcohol phosphate LUBROPHOS® RD/510-E; ethoxylated tridecyl phosphate mixture RHODAFAC® RS-610E; mixture of mono,di,tri-tridecyl-ethyleneglycol phosphate; polyethyle-ne glycol tridecyl ether phosphate RHODAFAC® RS410, diethyl ethyl phosphonate (CAS No. 765-79-6), dimethyl propyl phosphonate (CAS No. 18755-43-6), diethyl N,N-bis(2-hydroxyethyl) amino methyl phosphonate (CAS No. 2781-11-5), phosphonic acid methyl(5-methyl-2-methyl-1,3,2-dioxaphosphorinan-5-y)ester, P,P'-dioxide (CAS No. 42595-45-9), phosphonic acid, methyl(5-methyl-2-methyl-1,3,2-dioxaphosphorinan-5-yl)methyl,methyl ester,P-oxide (CAS No. 41203-81-0), and triethyl phosphate (CAS No. 78-40-4).

Alkyl aryl phosphates, suitable for use in the layer arrange-ment of the present invention as set forth above, are e.g. 2-ethyl hexyl diphenyl phosphate, known as PHOSFLEX® 362 and iso-decyl diphenyl phosphate PHOSFLEX® 390, wherein products having the trademark name PHOSFLEX are produced by Akzo NV, Arnhem, The Netherlands.

Triaryl phosphates, suitable for use in the layer arrangement of the present invention as set forth above, are e.g. isopropylated triphenyl phosphate PHOSFLEX® 31L, isopropylated triphenyl phosphate PHOSFLEX® 41L, iso butylated triphenyl phosphate PHOSFLEX® 71B, triphenyl phosphate PHOSFLEX® TPP, cresyl diphenyl phosphate PHOSFLEX® CDP and tricresylphosphate (CAS No.1330-

78-5), whereas tributyl phosphate, known as PHOSFLEX® 4 is a suitable example of an alkyl phosphate. Special useful products further are PHOSFLEX® A314, PHOSFLEX® A318, PHOSFLEX® A319, PHOSFLEX® A321 and PHOSFLEX® A 327.

According to the present invention a panel having a sheet or foil is provided, wherein the layer unit as disclosed above is present on at least one side of a support as a protective layer arrangement. That support can be any support known in the art: any solid of an organic or inorganic nature, which can assume any geometrical shape, such as foils, fibers (e.g. carbon fiber reinforced resin sheets and more particularly sheets, each of which includes carbon fibers arranged in a direction and impregnated with a heat resistant resin such that directions of the carbon fibers in the carbon fiber reinforced resin sheets are different from each other), and particles can be used. As an inorganic non-metallic support chemically reinforced glass or crystallized glass can be used. Inorganic metallic supports, suitable for use are, e.g. metal substrates such as those of aluminum, titanium, lead, iron, copper, steel, molybdenum, beryllium; supports of metallic and non-metallic oxides such as those of aluminum, titanium, lead, copper, beryllium, manganese, tungsten, vanadium, and silicon oxides.

As an organic support a polyimide sheet, epoxy compounds and thermoplastic and thermosetting compounds of different compositions, polyether, polyester and polycarbonate compositions may be used, without however being limited thereto. It is recommended to subject the support to cleaning procedures as to washing and degreasing before applying a protective layer unit or arrangement as set forth above.

The panel thus protected from moisture and scratches, having a sheet or foil as in the present invention, may advantageously have phosphoric acid ester primers as adhesives between the support materials mentioned hereinbefore and a parylene layer, if present between support and phosphor layer, just as disclosed in EP-A-0 226 193 and the corresponding U.S. Pat. No. 4,784,881. The adhesion promoting phosphoric acid ester primers have shown therein to be able to act as a "bridge" between the support surface and the p-xylylene polymer.

Divalent p-xylylene radicals e.g. are known to condense and polymerize almost instantaneously on a substrate or support, thereby forming a compact and homogeneous coating film, as in coating procedures described in Kirk-Othmer's Encyclopaedia of Chemical Technology, Third Edition, Vol 24, pages 746–747 (1984).

Solvents may vary as a function of the utilized adhesion promoting phosphoric acid ester compounds. Suitable solvents e.g. are alcohols, ketones, toluene, alkylacetates in any volumetric ratio, without however been limited thereto. In such solutions the amount of phosphoric acid ester compounds may range from 0.05 to 50% by weight, depending on the solvent used. Preferred concentrations are e.g. in a concentration range between 0.1 and 20% by weight. Substrate supports is may be treated with such solutions according to conventional techniques such as direct immersion or dipping of the support into the solution, or by means of spraying, etc. Solvent are, in most cases, further removed from the substrate by evaporation at room temperature or at higher temperatures, depending on the characteristics of the employed solvent.

It was however completely unexpected to get improved adhesion and reduction of scratch sensitivity, in addition to moisture protection when, according to the present invention a phosphor layer of a panel, sheet, plate or screen is covered with such a layer unit, wherein said layer unit acts as a barrier between phosphor layer and ambient air. Said phosphor layer of said sheet, plate or screen is thus a supported layer, sheet, plate or screen as it is present on a support, and, in most cases, coated onto that support, but alternatively it may have been prepared as a self-supporting unit before and brought into contact with said support and further laminated or adhered thereupon afterwards.

According to the present invention a panel is provided, wherein a phosphor layer, sheet, plate or screen has a main surface and edges, and wherein said parylene layer A, closest to said phosphor layer, is a layer wherein said parylene is selected from the group consisting of parylene C, parylene D and parylene HT.

The phosphor layer, sheet, screen or panel is thus supported and is normally present one side of said support, provided that on the same side of the support a protective layer unit as disclosed above, with a layer A more close to the phosphor layer, sheet, screen or panel is present as in inner layer of that unit, whereas layer B is present as an outermost layer farther away from said support than said layer A. As a phosphor panel normally has a support, impermeable to moisture, it is not required to have a parylene layer on the opposite side thereof, where no phosphor is present. For use however in certain applications wherein the same or a differing phosphor layer is present (differing in e.g. layer thickness and/or phosphor composition), it is however recommended to protect that phosphor layer in the same way with a protective layer unit as on the opposite side of the support. The double side coated phosphor layer arrangement is, in that particular case, sandwiched between two layer units, protecting both phosphor layer against moisture and scratches. In a preferred embodiment in that case, the protective layers are extending the dimensions of the panel, in that the parylene layers are fused at the edges in order to avoid moisture to come in along the edges. Further coating at the edges by means of the layer B having the phosphoric acid ester compounds as set forth above, e.g. by spray-coating or dip-coating is highly recommended in favor of protection against scratches.

According to the present invention the panel further comprises a support with a surface larger than the said main surface of said phosphor layer, so that the said phosphor layer leaves a portion of said support free, and said layer A covers at least a part of said portion of said support left free by said phosphor layer. Layer B in contact with layer A optionally covers that free portion of said support.

According to the present invention for panels as disclosed hereinbefore, in a preferred embodiment, layer A has a thickness in the range between 0.05 μm and 20 μm, and, even more preferably in the range between 1 μm and 10 μm.

Furtheron according to the present invention for panels as disclosed hereinbefore, in a preferred embodiment thereof, layer B present as an outermost layer has a thickness, t, and looses, in a Taber abrasion test (sandpaper P220, load 250 g, 500 cycles), at most 10% of the said thickness t.

In a panel according to the present invention said layer B preferably is a radiation-cured or heat-cured (thermally cured or hardened) polymeric layer. No general concentration of phosphoric acid ester compound in the coating solution of said layer B can be given as it strongly depends upon reactivity of the said esters: a very reactive ester as acrylate ester, e.g., may be present in an amount exceeding average concentrations.

The above-mentioned advantageous effects are thus realized by adding ester compounds of phosphoric acid to the lacquer of the outermost scratch resistant layer in contact with a moisture-protecting parylene layer at one side and ambient air at the other side. The adhesion of that outermost protective layer towards the moisture protecting parylene layer between said outermost layer and the phosphor layer is thereby significantly improved and, moreover, presence of a phosphoric acid ester compound does moreover significantly improve the scratch resistance properties of the topcoat layer.

According to the present invention a panel is preferred, wherein the phosphor layer is a photostimulable phosphor layer, also called "storage phosphor layer" (opposite to the conventionally known prompt emitting phosphor layers in intensifying screens or scintillators in scintillator panels, for which the present invention also applies, as alkali halide prompt emitting phosphors and scintillators are very moisture sensitive too). Storage phosphor panels with a protective parylene layer as an outermost layer protecting against moisture, do indeed gradually loose resistance towards moisture during use: it moreover seems that the layer can, when used in an automatic panel handling apparatus, quite easily be physically damaged or simply worn off, so that during use, as a consequence of insufficient scratch resistance the humidity resistance also diminishes. It has been found now that by application of the protective layer as in the layer arrangement of the present invention on top of the parylene layer, physical wear of the panel is efficiently prevented, so that the useful life of the panel is extended, provided that in the coating solution of that layer at least one phosphoric acid ester compound is present, as disclosed hereinbefore. Hereinafter more details with respect to specific layers used in the particular storage phosphor panels of the present invention are given.

The Layer a in a Phosphor Panel of the Present Invention

Preferred polymers for use in the preparation of the layer A of a phosphor panel of this invention are, poly(p-xylylene), poly(p-2-chloroxylylene), poly(p-2,6-dichloroxylylene) and fluoro substituted poly(p-xylylene).

Most preferred polymers for use in the protective layer of this invention are vacuum deposited, preferably chemically vacuum deposited poly-p-xylylene film. A poly-p-xylylene has repeating units in the range from 10 to 10000, wherein each repeating unit has an aromatic nuclear group, whether or not substituted. Each substituent group, if present, can be the same or different and can be any inert organic or inorganic group which can normally be substituted on aromatic nuclei. Illustrations of such substituent groups are alkyl, aryl, alkenyl, amino, cyano, carboxyl, alkoxy, hydroxylalkyl, carbalkoxy and similar groups as well as inorganic ions such as hydroxyl, nitro, halogen and other similar groups which are normally substitutable on aromatic nuclei. Particularly preferred substituted groups are those simple hydrocarbon groups such as the lower alkyl groups such as methyl, ethyl, propyl, butyl, hexyl and halogen groups particularly chlorine, bromine, iodine and fluorine as well as the cyano group and hydrogen.

As a basic agent the commercially available di-p-xylylene composition sold by the UNION CARBIDE Co. under the trademark "PARYLENE" is thus preferred. The preferred compositions for the protective moistureproof protective layer covering the phosphor layered is screens or sheets or thus are the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation, moisture resistance being about the same as the moisture resistance of "PARYLENE C": see the note about "High Performance Coating for Electronics Resist Hydrocarbons and High Temperature" written by Guy Hall, Specialty Coating Systems, Indianapolis, available via www.scscookson.com. Technology Letters have also been made available by Specialty Coating Systems, a Cookson Company, as e.g. the one about "Solvent Resistance of the parylenes", wherein the effect of a wide variety of organic solvents on parylenes N, C, and D was investigated. Most preferred polymers for use in the preparation of the layer A of a phosphor panel of this invention are poly(p-2-chloroxylylene), i.e. PARYLENE C film, poly(p-2,6-dichloroxylylene), i.e. PARYLENE D film and "PARYLENE HT" (a completely fluorine substituted version of PARYLENE N. Parylene is available from a variety of sources and is commonly used for protecting printed circuit boards, sensors, and other electronic and electrical devices. Although the specific manner in which the parylene is applied to the phosphor layer forms no part of the present invention, it is preferred to apply the parylene layer by chemical vapour deposition (CVD). A method for doing so is disclosed in EP-A-1 286 362, EP-A-1 286 363, EP-A-1 286 364 and EP-A-1 286 365. The process of deposition basically proceeds as follows:

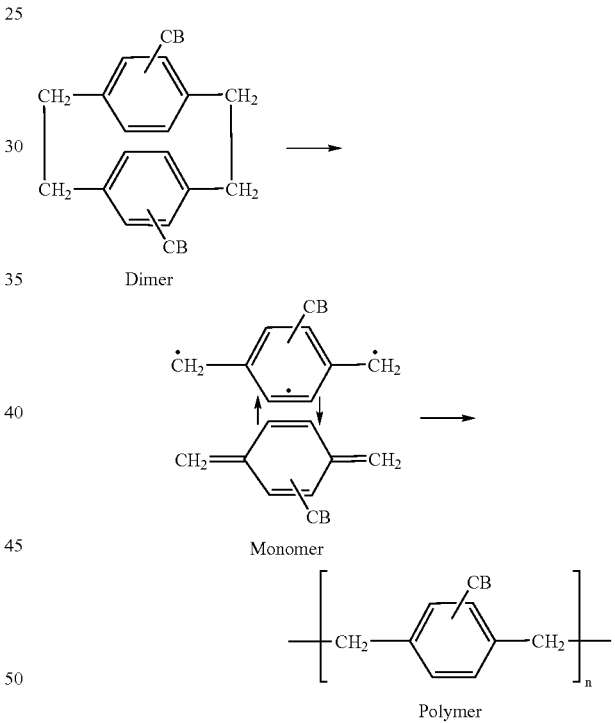

A suitable dimer, —e.g., (cyclo-di(p-xylene) for the deposition of PARYLENE N, cyclo-di(p-2-chloroxylene) for the deposition of PARYLENE C or cyclo-di(p-2,6-dichloroxylene) for the deposition of PARYLENE D), —is heated and decomposes in two radicals.

These radicals are deposited on the phosphor layer where they polymerize and form a polymeric layer. The chemical vapour deposition of the parylene layer (either PARYLENE N, C or D) has several advantages as the layer is deposited without pinholes and as the barrier layer is not only deposited on the main surface of the phosphor layer, but also on the edges so that the sealing of the phosphor layer is complete. Preferably the layer A, in a phosphor panel of this invention, is immediately adjacent to the phosphor layer.

The Layer B in a Phosphor Screen of the Present Invention

The layer B in a phosphor screen of this invention can be any polymeric layer known in the art of applying a protective layer to a phosphor screen, provided that said layer B comprises at least one phosphoric acid ester compound. In a preferred embodiment according to the present invention said phosphoric acid ester compound is selected from the group of compounds disclosed hereinbefore. The layer B can be coated onto the phosphor panel by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor panel as described in published EP-A-392 474.

In a preferred embodiment, the layer B is produced with a radiation-curable composition, thus providing, according to the present invention, a radiation cured polymeric layer. Use of a radiation curable coating as protective top layer in a X-ray conversion screen has been described e.g. in EP-A-209 358 and JP-A-86 176 900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

Very useful radiation curable compositions for forming a protective coating according to the present invention contain as primary components: (1) a cross-linkable prepolymer or oligomer or a mixture of cross-linkable prepolymers or oligomers, (2) a reactive diluent monomer or mixture of reactive diluent monomers, and (3) in the case of a UV curable formulation a photoinitiator. The usual amounts of these primary components calculated on the total coating composition are in the range from 30–100% by weight for the prepolymer, 10–70% by weight for the reactive diluent and 0–10% by weight for the photoinitiator. Non-reactive organic solvents for the prepolymer may be present, and are even required as in case of spray-coating or dip-coating.

Although any radiation curable composition known in the art, as e.g., the composition disclosed in EP-A-510 753 can be used, it may be very beneficial to have a coating solution containing fluorinated compounds so that the finished protective layer comprises fluorinated moieties.

As desired the layer B of a phosphor panel of the present invention is an outermost layer in contact with ambient air, having good abrasion properties. The abrasion properties of the layer B are tested in a Taber abrasion test using a TELEDYNE TABER 5130 Abraser (trade name of Taber Industries, New York, USA) with rotation elements CALIBRASE CS10F, sandpaper P220, and load of 250 g on each element. According to the present invention the percentage thickness loss of the layer B can be measured after 500 cycles. Preferably the layer B looses, in the test as described above, at most 10% of its thickness. If desired or required, the layer B of the present invention may include spacing particles in favor of improved transportability and adjusted electrostatic properties. Suitable spacing agents in form of friction reducing polymer beads are selected from the group consisting of solid polystyrene, solid polyalkylene and a solid organic fluorinated polymer. Preferably the spacing agents are beads incorporating fluorinated moieties. Such beads have been described in U.S. Pat. No. 4,059,768. In the construction of the scanning apparatus used for reading storage phosphor screens the trend is towards more and more compact apparatus, so that the distance between the (moving) storage phosphor screen and mechanical (moving) parts of the scanner can become very low (e.g. inbetween 10–100 μm).

When then a storage phosphor screen with a layer B according to the present invention has protruding beads it is important that the beads do not touch mechanical parts of the scanner and that this is true even when the storage panel shows some wobble during transport in the scanner. Therefore beads used as spacing particles in a storage phosphor screen of the present invention preferably have a median volume diameter, $d_{v50}$, so that 5 μm$\leq d_{v50} \leq$25 μm and a median numeric diameter, $d_{n50}$, so that $1 \leq d_{v50}/d_{n50} \leq 1.20$. Further the beads are preferably adapted to the thickness, t, of the layer B on the storage panel of the present invention so that said polymeric beads have a median volume diameter, $d_{v50}$, wherein $1.25 \leq d_{v50}/t \leq 4.0$.

The Storage Phosphor Layer in the Phosphor Panel of the Present Invention

The storage phosphor layer in a panel of the present invention may comprise any photostimulable phosphor known in the art. The phosphor layer in a panel according to the present invention may be a layer including a phosphor mixed in a polymer binder as well a binderless phosphor layer. A phosphor panel having a protective layer according to the present invention may comprise a hygroscopic phosphor. A panel according to the present invention thus preferably has a photostimulable phosphor layer which layer comprises a binderless photostimulable phosphor. A preferred panel according to the present invention is a panel wherein said binderless photostimulable phosphor is a CsX:Eu stimulable phosphor, wherein X represents a halide selected from the group consisting of Br and Cl as disclosed in WO 01/03156. Besides CsX as a matrix compound and Eu as a dopant, impurities further elements, whether or not as impurities, may be present in the phosphor composition. The binderless CsX:Eu stimulable phosphor layers comprise needle-shaped phosphor particles, separated by voids. Said voids may be filled, up to a defined extent, as has been set forth in EP-A's 1 316 969 and 1 347 460. In favor of image sharpness said phosphor particles may be colored with a nanocrystalline dye as described in EP-A 1 349 177.

When on such a phosphor layer with needle shaped phosphor crystals, separated by voids, a layer A with very low water permeability is deposited, it is preferred that this layer A is a chemical vacuum deposited parylene layer, while such a layer not only covers the surface of the needle crystals, but also covers the voids between the needles thus protecting the edges of the phosphor needles thoroughly against humidity. A phosphor panel of the present invention may also comprise edge reinforcements as the ones described in e.g. U.S. Pat. No. 5,334,842 and U.S. Pat. No. 5,340,661.

A phosphor panel of the present invention can be a self-supporting panel as well as a panel comprising a support. This support can be any support known in the art, but in view of the desired high humidity resistance of the screens, a support with very low water vapour permeability is preferably used. A preferred support is a support of anodized aluminium and the supports as disclosed in EP-A-1 316 971 and in EP-A-1 316 972.

In a particular embodiment of the present invention the surface of the phosphor layer is smaller than the surface of the support so that the phosphor layer does not reach the edges of the support. Thus a panel with a support having a surface larger than the main surface of the phosphor layer, so that the phosphor layer leaves a portion of the support free, and wherein the protective layer comprising layer A and layer B covers at least in part the portion of the support left free by the phosphor layer represents a particular embodiment of the present invention as already disclosed hereinbefore. An advantage of such a construction resides in the fact that the edges of the phosphor layer do not touch mechanical parts of the apparatus and are thus less easily damaged during use of the panel, more particularly e.g. during transport in the scanner. Another advantage of this construction is that no special edge reinforcement is necessary (although, if desired, further edge reinforcement can be applied). Although a construction of a phosphor panel wherein the surface of the phosphor layer is smaller than the surface of the support, so that the phosphor layer does not reach the edges of the support, represents a specific embodiment of the present invention, such a construction can be beneficial for the manufacture of any phosphor panel covered with any protective layer known in the art.

In the case wherein between the support material and the phosphor layer a parylene layer is present, the surface roughness of the covered support shows a better smoothness as surface roughness decreases (preferably 0.5 or less and even more preferably 0.1 or less), which may be in favor of depositing columnar crystals or needles having smaller diameters, thereby leading to an improved packing density of the said needles per square unit of the surface area of the vapour deposited photostimulable phosphor layer and improved sharpness or image definition. More details about dimensions of such columnar, needle-shaped or cylindrical phosphors have been disclosed in EP-A 1 359 204.

The invention moreover encompasses a method for improving adhesion of an organic coating onto p-xylylene (parylene) polymer layers by the step of adding at least one ester compound of phosphoric acid to an organic coating solution, wherein said at least one phosphoric acid ester compound is represented by the general formula (I) given hereinbefore and specified herein as being selected from the group of compounds consisting of methacryl-ethyl phosphate, acryl-ethyl phosphate, di-methacrylethyl phosphate, methacrylethyl-methacrylpropyl-phosphate, di-acrylethyl phosphate, methacrylpropyl phosphate, acrylpropyl phosphate, dimethacrylpropyl phosphate, methacrylethyl-methacryl-propyl phosphate, dodecyl-polyethyleenglycolphosphate, polyethylene glycol-tridecylether phosphate, monoalkylphenyl-polyethyleenglycol phosphate, dioctylphenyl-polyethyleenglycol phosphate, 2-(phosphonoxy)ethyl-2-propenoate, 4-(phosphonoxy)butyl-2-propenoate, phosphinicobis(oxy-2,1-ethane diyl)-di-2-propenoate, tris-acryloyl-oxyethyl phosphate, nonylphenol ethoxylate phosphate, phenol ethoxylate phosphate, diethyl(ethoxycarbonyl-methane)phosphonate, ethoxylated fatty alcohol phosphate, ethoxylated tridecyl phosphate mixture, mixture of mono,di,tri-tridecylethyleneglycol phosphate, polyethylene glycol tridecyl ether phosphate, diethyl ethyl phosphonate, dimethyl propyl phosphonate, diethyl N,N-bis(2-hydroxyethyl)amino methyl phosphonate, phosphonic acid methyl(5-methyl-2-methyl-1,3,2-dioxaphosphorinan-5-y)ester, P,P'-dioxide, phosphonic acid, methyl(5-methyl-2-methyl-1,3,2-dioxaphosphorinan-5-yl)methyl, methyl ester, P-oxide, triethyl phosphate, 2-ethylhexyl diphenyl phosphate, iso-decyl diphenyl phosphate, isopropylated triphenyl phosphate, isopropylated triphenyl phos-phate, iso butylated triphenyl phosphate, triphenyl phosphate, cresyl diphenyl phosphate, tributyl phosphate and tricresyl phosphate, without however being limited thereto.

The present invention further encompasses a method for preparing a binderless phosphor panel comprising the steps of:

providing a support, optionally coated with a parylene layer;

vapour depositing a CsX:Eu phosphor, wherein X represents a halide selected from the group consisting of Br and Cl, thereby forming a binderless phosphor layer on the said (optionally covered) support;

applying a layer of parylene on the said binderless phosphor layer by chemical vapour deposition, thereby forming a layer A;

applying a radiation curable solution on top of the said layer A; wherein said solution comprises at least one ester compound of phosphoric acid; and curing said panel by UV and/or electron beam exposure, thereby forming layer B.

As an advantageous effect of the present invention the physical stability of the phosphor imaging plates has been proved to satisfy the most stringent requirements, in that the image quality is not changed over a long period of frequent use.

Adhesion improvement by use of ester compounds of phosphoric acid in organic coatings that are applied onto parylene layers has unambiguously led to radiographic imaging plates that are reliable over quite a long period of time, even after frequent reuse.

EXAMPLES

While the present invention will hereinafter be described in connection with preferred embodiments thereof, it will be understood that it is not intended to limit the invention to those embodiments.

In a first experiment, CsBr:Eu screens were made via thermal vapour deposition of CsBr and EuOBr. Therefore CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During evaporation, the substrate was rotated at 12 r.p.m.

The container with starting materials was heated to a temperature of 750° C. Before starting evaporation the chamber was evacuated to a pressure of $4.10^{-5}$ mbar. During the evaporation process, Ar was introduced in the chamber; temperature of the substrate was 150° C. and Ar-pressure 2.2 Pa·s. The Eu-concentration in the evaporated screens was measured with X-ray fluorescence and was of the order of 800 p.p.m.

The screen was divided in four portions in order to prepare 4 test screens:
1. On the first portion NO protective layer was applied
2. On the second portion a radiation curable solution was applied by screen printing and then UV-radiation cured in order to produce a protective layer having a thickness of 10 μm (=layer B of the present invention). Examples of the composition of these radiation curable solutions in order to produce layer B of the present invention are described hereinafter.
3. On the third portion a layer of Parylene C was deposited by chemical vapour deposition in a well known Gorham Process, in order to give a layer of 8 μm thickness (=layer A of present invention).
4. On the fourth portion a layer of Parylene C as on the third portion was applied and on top of it a radiation cured layer as on the second portion. In this screen both the layer A and B of the present invention are thus present.

The quality of the screens was tested by immersing the four test screens in water for 24 hours, checking the physical integrity of the screen and, where possible, the speed performance. Moreover the surface strength was tested with a TELEDYNE TABER 5130 Abraser with rotation elements CALIBRASE CS10F, sandpaper P220, load 250 g on each element.

The percentage of thickness loss of the layers was measured after 500 cycles. Results have been summarized in Table 1 hereinafter.

TABLE 1

| Screen # | Layer A | Layer B | After 24 h in water | Thickness loss (Taber) |
|---|---|---|---|---|
| 1 | NO | NO | Phosphor layer dissolved | Not relevant |
| 2 | NO | YES | screen intact but speed loss due to protective layer intrusion | 10% |
| 3 | YES | NO | Screen intact but no abrasion resistance | 100% |
| 4 | YES | YES | Screen intact and no speed loss | 10% |

In a second experiment, several coating solutions were applied onto a parylene C layer that was CVD-deposited on an aluminium substrate, by means of different application techniques in order to study the improvement of the adhesion properties when making use of phosphoric acid esters.

Application A: 5.0 g of a (MMA-co-BMA)-copolymerizate was dissolved in 25.0 gr of 1,6-hexanedioldiacrylate. To this solution, 25.0 g of Laromer TMPTA of BASF and 45.0 gr of Ebecryl 1290, a hexafunctional urethane acrylate of UCB were added and homogenized. Hereto, 3.0% of Modaflow from MONSANTO was added in order to increase spreading onto the parylene layer. 4.0 g Darocur 1173 from CIBA (Germany) and 4.0 g benzophenone were dissolved in the lacquer as initiators for the UV curing. The coating solution was applied by means of screen printing and polymerized by means of UV-curing with an intensity of 200 mW/cm$^2$.

Application B: To 20.0 g of the solution used in application A, 5.0 gr of Rhodafac RM 710 of RHODIA, a dioctylphenylpolyethylene-glycolphosphate, was added as a "parylene-adhesion improving" agent. The coating solution was applied and cured, just as in application A.

Application C: To 20.0 g of the oligomeric coating solution of application A, containing (MMA-co-BMA)-copolymerizate, 1,6-hexanedioldiacrylate, trimethylolpropanetriacrylate and a hexafunctional urethane acrylate, 0.1 g of a fluorinated surfactant from 3M is added to increase spreading and layer homogenity and 0.8 g Darocur 1173 and 0.8 gr benzophenone are added to make radical polymerization by means of UV-exposition possible. As a phosphoric acid ester, 2.0 g of dipolyoxyethylenetridecyletherphosphate was dissolved in the coating solution. In order to decrease its viscosity and to make spraying possible, a solvent mixture of 40% methylethylketone, 30% methylisobutylketone and 30% methoxypropanol were added to become a clear, low viscous 5% oligomeric coating solution. This solution was sprayed onto the parylene layer, whereafter the coating is formed by evaporating the solvents under elevated temperature and UV-curing.

Application D: 10 g of Neocryl B-725 from ZENECA were dissolved in 60 g of a mixture of 50% trimethylolpropanetriacrylate/40% poly(oxy-1,2-ethanediyl-hydro-(1-oxo-2-propenyloxy))-ether/10% 2-ethyl-2(hydroxymethyl)-1,3-propanediol, whereafter 30.0 g of a hexafunctional urethane acrylate and 20.0 g of a siloxazane were added, together with 500 g of methylethylketone and 380 g diethylketone, in order to get a clear, low viscous solution with a viscosity of 5 mPa·s. In order to increase adhesion to the parylene layer after application by means of dip-coating and UV-curing, 5.0 g of Rhodafac RS410 from RHODIA and 15.0 g phosphinicobis(oxy-2,1-ethanediyl)-di-2-propenoate, an acrylated phosphoric acid diester, were added to the coating solution. UV-initiators were 4.0% of 1-hydroxy-cyclohexyl-phenylketone and 2.0% of benzophenone.

Application E: A solution of polysiloxazane and urethaneacrylates was sprayed onto the parylene layer and cured under the influence of atmospheric moisture at 60° C. during 20 h in order to get a 6 μm abrasion-resistant, clear, non-brittle layer, with good adhesive properties.

The applied polymeric solution was a mixture of 7.5 g of poly(oxy-1,2-ethanedi-yl-hydro-(1-oxo-2-propenyloxy))-ether, 2.5 g of 2-ethyl-2(hydroxymethyl)-1,3-propanediol, 5.0 g of Sartomer SR238, 15.0 g of Ebecryl 1290 and 60.0 gr of Kion ML33/C33 from KION Corp., Columbus, USA. These oligomers were dissolved in a mixture of 400 g of methyl ethyl ketone, 150 g of methylisobutylketone and 150 g of methoxy-propanol. In order to get a better thermally cured layer, tertiair butylperoxy-2-ethylhexyl carbonate was added to the solution in a 5 wt % ratio. As adhesion promotor, mono(alkylphenylpolyethylene-glycol)-phosphate was added in a 5 wt % ratio. Levelling of the layer was improved by adding 0.25 wt % of BYK UV3500 from BYK Chemie.

The adhesion of the applied protective layers onto the parylene layer was evaluated by means of a cross-cut adhesion test by standards ASTM D3359-D3002/DIN 53151/ISO 2409 with a cutter supplied by BRAIVE INSTRUMENTS, Belgium. The test was carried out with the corresponding tape from the same supplier.

The abrasion resistance of the protective layer was tested with a Teledyne Taber 5130 Abraser with Calibrase CS10F elements and load of 250 g on each element.

The mass loss of the layer (in milligrams) was measured after 100 cycles. The abrasion area was constant for all tests.

Results are summarized in Table 2 hereinafter.

TABLE 2

| | adhesion promotor | adhesion test | abrasion resistance (mg/100 cycles) | protective layer thickness (μm) |
|---|---|---|---|---|
| Appl. A | no | W4-W5 | 0.2 | 10 |
| Appl. B | yes | W0 | 0.2 | 9 |
| Appl. C | yes | W0 | 0.5 | 5 |
| Appl. D | yes | W1 | 0.8 | 8 |
| Appl. E | yes | W0 | 1.0 | 12 |

It is clear that the adhesion is strongly increased by making use, in the coating solution of an outermost layer onto the moisture protecting parylene layer, of the phosphoric acid esters. No negative effects on the abrasion resistance of the protective layers were observed, so that the objects of the present invention were fully reached.

Having described in detail preferred embodiments of the current invention, it will now be apparent to those skilled in the art that numerous modifications can be made therein without departing from the scope of the invention as defined in the appending claims.

What is claimed is:

1. A sheet or foil comprising a layer unit, divided into at least two layers: a layer A, being a layer of p-xylylene (parylene) and a layer B, wherein layer B, optionally present on both sides of layer A, is characterized in that it comprises at least one phosphoric acid ester compound according to the general formula (I)

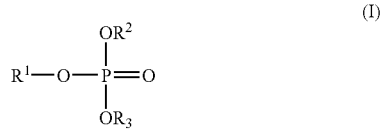

wherein each of $R^1$, $R^2$ and $R^3$ are same or different, and are selected from the group consisting of hydrogen, a saturated or unsaturated, substituted or unsubstituted aliphatic group and a substituted or unsubstituted aromatic group wherein at least one of said layer B is an outermost layer.

2. A protective sheet or foil according to claim 1, wherein said phosphoric acid ester compound is selected from the group of compounds consisting of methacryl-ethyl phosphate, acryl-ethyl phosphate, di-methacrylethyl phosphate, methacrylethyl-methacrylpropyl-phosphate, di-acrylethyl phosphate, methacrylpropyl phosphate, acryipropyl phosphate, dimethacrylpropyl phosphate, methacrylethyl-methacryl-propyl phosphate, dodecyl-polyethyleenglycolphosphate, polyethylene glycol-tridecylether phosphate, monoalkylphenyl-polyethyleenqlycol phosphate, dioctylphenyl-polyethyleenglycol phosphate, 2-(phosphonoxy)ethyl-2-propenoate, 4-(phosphonoxy)butyl-2-propenoate, and phosphinicobis (oxy2,1-ethandiyl)di-2-propenoate, tris-acryloyl-oxyethyl phosphate, nonyiphenol ethoxylate phosphate, phenol ethoxylate phosphate, diethyl (ethoxycarbonyl-methane)phosphonate, ethoxylated fatty alcohol phosphate, ethoxylated tridecyl phosphate mixture, mixture of mono,di,tri-tridecylethyleneglycol phosphate, polyethylene glycol tridecyl ether phosphate, diethyl ethyl phosphonate, dimethyl propyl phosphonate, diethyl N,N-bis(2-hydroxyethyl)amino methyl phosphonate, phosphonic acid methyl(5methyl-2methyl1,3,2-dioxaphosphorinan-5-y)ester, P,P'-dioxide, phosphonic acid, methyl(5-methyl2-methyl-1,3,2-dioxaphosphori-nan-5-yl)methyl, methyl ester, P-oxide, triethyl phosphate, 2-ethylhexyl diphenyl phosphate, iso-decyl diphenyl phosphate, iso propylated triphenyl phosphate, iso propylated triphenyl phos-phate, iso butylated triphenyl phosphate, triphenyl phosphate, cresyl diphenyl phosphate, tributyl phosphate and tricresyl phosphate.

3. A panel having a protective sheet or foil according to claim 2, wherein said layer unit is present on at least one side of a support.

4. A panel according to claim 3, wherein a phosphor sheet, plate or screen is present inbetween said support and said layer unit.

5. A panel according to claim 4, wherein said layer B is an outermost layer, has a thickness, t, and looses in a Taber abrasion test (sandpaper P220, load 250 g, 500 cycles) at most 10% of the said thickness t.

6. A panel according to claim 5, wherein said layer B is a radiation-cured or heat-cured polymeric layer.

7. A panel according to claim 3, wherein a phosphor layer, sheet, plate or screen has a main surface and edges, and wherein said parylene layer A, closest to said phosphor layer, is a layer wherein said parylene is selected from the group consisting of parylene C, parylene D and parylene HT.

8. A panel according to claim 7, wherein said layer B is an outermost layer, has a thickness, t, and looses in a Taber abrasion test (sandpaper P220, load 250 g, 500 cycles) at most 10% of the said thickness t.

9. A panel according to claim 8, wherein said layer B is a radiation-cured or heat-cured polymeric layer.

10. A panel according to claim 7, wherein said layer A has a thickness in the range between 0.05 μm and 20 μm.

11. A panel according to claim 3, wherein said layer B is an outermost layer, has a thickness, t, and looses in a Taber abrasion test (sandpaper P220, load 250 g, 500 cycles) at most 10% of the said thickness t.

12. A panel according to claim 11, wherein said layer B is a radiation-cured or heat-cured polymeric layer.

13. A panel having a protective sheet or foil according to claim 1, wherein said layer unit is present on at least one side of a support.

14. A panel according to claim 13, wherein a phosphor sheet, plate or screen is present inbetween said support and said layer unit.

15. A panel according to claim 13, wherein a phosphor layer, sheet, plate or screen has a main surface and edges, and wherein said parylene layer A, closest to said phosphor layer, is a layer wherein said parylene is selected from the group consisting of parylene C, parylene D and parylene HT.

16. A panel according to claim 15, wherein said layer B is an outermost layer, has a thickness, t, and looses in a Taber abrasion test (sandpaper P220, load 250 g, 500 cycles) at most 10% of the said thickness t.

17. A panel according to claim 16, wherein said layer B is a radiation-cured or heat-cured polymeric layer.

18. A panel according to claim 15, wherein said layer A has a thickness in the range between 0.05 μm and 20 μm.

19. A panel according to claim 18, wherein the panel further comprises a support with a surface larger than the said main surface of said phosphor layer, so that the said phosphor layer leaves a portion of said support free, and said layer A covers at least a part of said portion of said support left free by said phosphor layer.

20. A panel according to claim 18, wherein said phosphor layer is a photostimulable phosphor layer.

21. A panel according to claim 18, wherein said phosphor layer is a photostimulable phosphor layer and said photostimulable phosphor layer comprises a binderless photostimulable phosphor.

22. A panel according to claim 21, wherein said binderless photostimulable phosphor is a CsX:Eu stimulable phosphor, wherein X represents a halide selected from the group consisting of Br and Cl.

23. A panel according to claim 15, wherein the panel further comprises a support with a surface larger than the said main surface of said phosphor layer, so that the said phosphor layer leaves a portion of said support free, and said layer A covers at least a part of said portion of said support left free by said phosphor layer.

24. A panel according to claim 15, wherein said phosphor layer is aphotostimulable phosphor layer.

25. A panel according to claim 15, wherein said phosphor layer is a photostimulable phosphor layer and said photostimulable phosphor layer comprises a binderless photostimulable phosphor.

26. A panel according to claim 25, wherein said binderless photostimulable phosphor is a CsX:Eu stimulable phosphor, wherein X represents a halide selected from the group consisting of Br and Cl.

27. A panel according to claim 14, wherein said layer B is an outermost layer, has a thickness, t, and looses in a Taber abrasion test (sandpaper P220, load 250 g, 500 cycles) at most 10% of the said thickness t.

28. A panel according to claim 27, wherein said layer B is a radiation-cured or heat-cured polymeric layer.

29. A panel according to claim 14, wherein the panel further comprises a support with a surface larger than the said main surface of said phosphor layer, so that the said phosphor layer leaves a portion of said support free, and said layer A covers at least a part of said portion of said support left free by said phosphor layer.

30. A panel according to claim 29, wherein said phosphor layer is a photostimulable phosphor layer.

31. A panel according to claim 29, wherein said phosphor layer is a photostimulable phosphor layer and said photostimulable phosphor layer comprises a binderless photostimulable phosphor.

32. A panel according to claim 31, wherein said binderless photostimulable phosphor is a CsX:Eu stimulable phosphor, wherein X represents a halide selected from the group consisting of Br and Cl.

33. A panel according to claim 14, wherein said phosphor layer is a photostimulable phosphor layer.

34. A panel according to claim 14, wherein said phosphor layer is a photostimulable phosphor layer and said photostimulable phosphor layer comprises a binderless photostimulable phosphor.

35. A panel according to claim 34, wherein said binderless photostimulable phosphor is a CsX:Eu stimulable phosphor, wherein X represents a halide selected from the group consisting of Br and Cl.

36. A panel according to claim 3, wherein said layer B is an outermost layer, has a thickness, t, and looses in a Taber abrasion test (sandpaper P220, load 250 g, 500 cycles) at most 10% of the said thickness t.

37. A panel according to claim 36, wherein said layer B is a radiation-cured or heat-cured polymeric layer.

38. A panel according to claim 37, wherein the panel further comprises a support with a surface larger than the said main surface of said phosphor layer, so that the said phosphor layer leaves a portion of said support free, and said layer A covers at least a part of said portion of said support left free by said phosphor layer.

39. A panel according to claim 37, further comprising a phosphor layer wherein said phosphor layer is a photostimulable phosphor layer.

40. A panel according to claim 37, wherein said phosphor layer is a photostimulable phosphor layer and said photostimulable phosphor layer comprises a binderless photostimulable phosphor.

41. A panel according to claim 40, wherein said binderless photostimulable phosphor is a CsX:Eu stimulable phosphor, wherein X represents a halide selected from the group consisting of Br and Cl.

42. A panel according to claim 36, wherein the panel further comprises a support with a surface larger than the said main surface of said phosphor layer, so that the said phosphor layer leaves a portion of said support free, and said layer A covers at least a part of said portion of said support left free by said phosphor layer.

43. A panel according to claim 36, further comprising a phosphor layer wherein said phosphor layer is a photostimulable phosphor layer.

44. A panel according to claim 36, wherein said phosphor layer is a photostimulable phosphor layer and said photostimulable phosphor layer comprises a binderless photostimulable phosphor.

45. A panel according to claim 44, wherein said binderless photostimulable phosphor is a CsX:Eu stimulable phosphor, wherein X represents a halide selected from the group consisting of Br and Cl.

* * * * *

UNITED STATES PATENT AND TRADEMARK OFFICE
CERTIFICATE OF CORRECTION

| | | |
|---|---|---|
| PATENT NO. | : 7,193,226 B2 | Page 1 of 1 |
| APPLICATION NO. | : 10/939697 | |
| DATED | : March 20, 2007 | |
| INVENTOR(S) | : Van den Bergh et al. | |

It is certified that error appears in the above-identified patent and that said Letters Patent is hereby corrected as shown below:

Column 10, line 8, claim 9, "of claim 7" should read --of claim 13--.

Signed and Sealed this

Twenty-fourth Day of July, 2007

JON W. DUDAS
*Director of the United States Patent and Trademark Office*